No. 843,696. PATENTED FEB. 12, 1907.
J. & K. POSKOCIL.
MEAT CUTTER.
APPLICATION FILED AUG. 18, 1906.
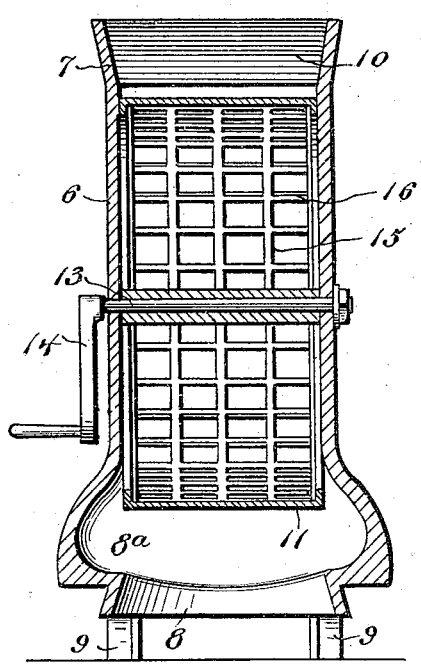
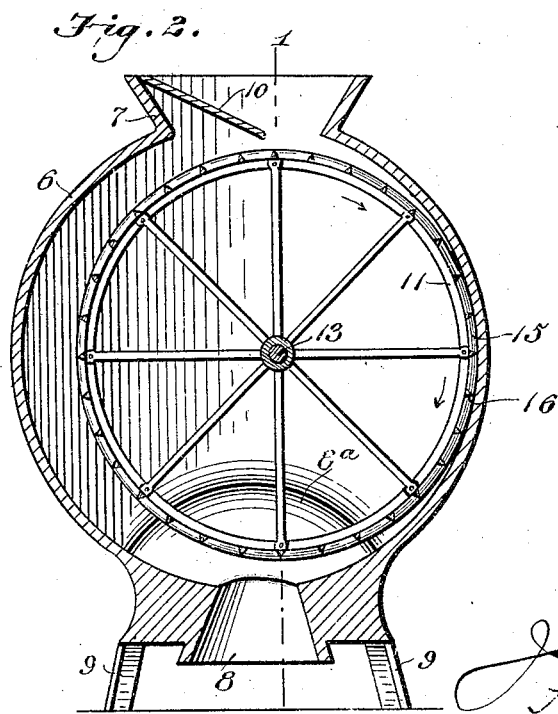
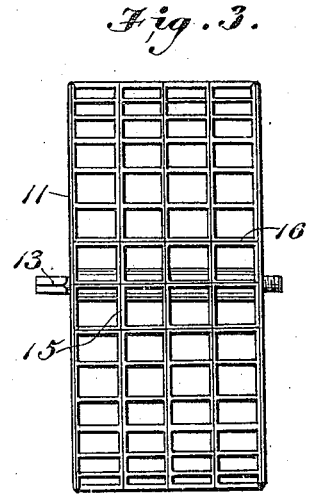

UNITED STATES PATENT OFFICE.

JOSEPH POSKOCIL AND KATHARINE POSKOCIL, OF CLEVELAND, OHIO.

MEAT-CUTTER.

No. 843,696.      Specification of Letters Patent.      Patented Feb. 12, 1907.

Application filed August 18, 1906. Serial No. 331,198.

*To all whom it may concern:*

Be it known that we, JOSEPH POSKOCIL and KATHARINE POSKOCIL, citizens of the United States, residing at Cleveland, in the county of Cuyahoga and State of Ohio, have invented new and useful Improvements in Meat-Cutters, of which the following is a specification.

This invention is a machine for cutting meat, and particularly for cutting suet and other fats into cubes preparatory to rendering the same into lard.

The object of the invention is to provide an improved device which will cut material into cubes of small and uniform pieces to render the same more suitable for the subsequent treatment.

In the accompanying drawings, Figure 1 is a vertical cross-section on the line 1 1 of Fig. 2. Fig. 2 is a vertical cross-section at right angles to Fig. 1. Fig. 3 is a detail, in front elevation, of the cutter removed from the casing.

Referring specifically to the drawings, the casing consists of a short or narrow cylinder 6, having at the top a hopper 7 and at the bottom, on each side, a passage or recess $8^a$ leading to an outlet 8. This casing stands upon legs 9. The hopper has an apron 10, which directs the meat toward one side of the cylinder.

Located eccentrically within the cylinder is a rotary cutter consisting of a wheel 11, mounted upon a shaft 13, which finds bearings in the ends of the casing and which is provided with a crank 14, by which it is operated. The periphery of the wheel is formed of a series of circumferential knives 15 and longitudinal knives 16, producing a large number of rectangular openings or spaces therebetween. The whole peripheral surface of the wheel is thus provided with these openings, the walls of which are formed by the circumferential and longitudinal blades referred to. The shaft is so set eccentrically to the casing that the cutter is in contact, or in very close proximity, with one side of the cylinder, as shown in Fig. 2, being the side toward which the material is directed from the apron 10. The sides of the wheel or drum are located in close proximity to the sides of the cylinder.

In operation the suet, which generally comes in strips, is fed into the hopper onto the cutter and is carried thereby against the cylinder-wall, so that the knives are pressed into the material, cutting the same accordingly in cubes, which are forced through the openings between the knives and drop out through the recesses $8^a$ and opening 8 at the bottom into a receptacle which may be placed there to receive them.

In view of the continuous operation and peculiar construction of the cutter the capacity of the machine is large, and a great amount of suet may be quickly cut into small pieces for the purpose referred to. Obviously the cutter may be driven by power other than hand, if desired.

We claim—

1. A meat-cutter comprising a casing having a feed-opening at the top and a discharge-opening at the bottom, and a rotary cutter within said casing having crossed blades at the periphery thereof, in close proximity to one wall of the casing.

2. A meat-cutter comprising a cylindrical casing having feed and discharge openings, and a circular rotatable cutter therein having series of crossed circumferential and longitudinal blades at the periphery thereof forming openings therebetween, the edges of the blades passing very close to one wall of the cylinder.

3. A meat-cutter comprising a cylindrical casing set with its axis horizontally and having a feed-hopper at the top and a discharge-opening at the bottom, and a circular cutter rotatable in the casing and set eccentrically therein, and having crossed blades at its periphery cutting against one side of the casing.

In testimony whereof we have signed our names to this specification in the presence of two subscribing witnesses.

JOSEPH POSKOCIL.
           KATHARINE POSKOCIL.

Witnesses:
     JOHN A. BOMMHARDT,
     SHIRLEY J. BOMMHARDT.